UNITED STATES PATENT OFFICE.

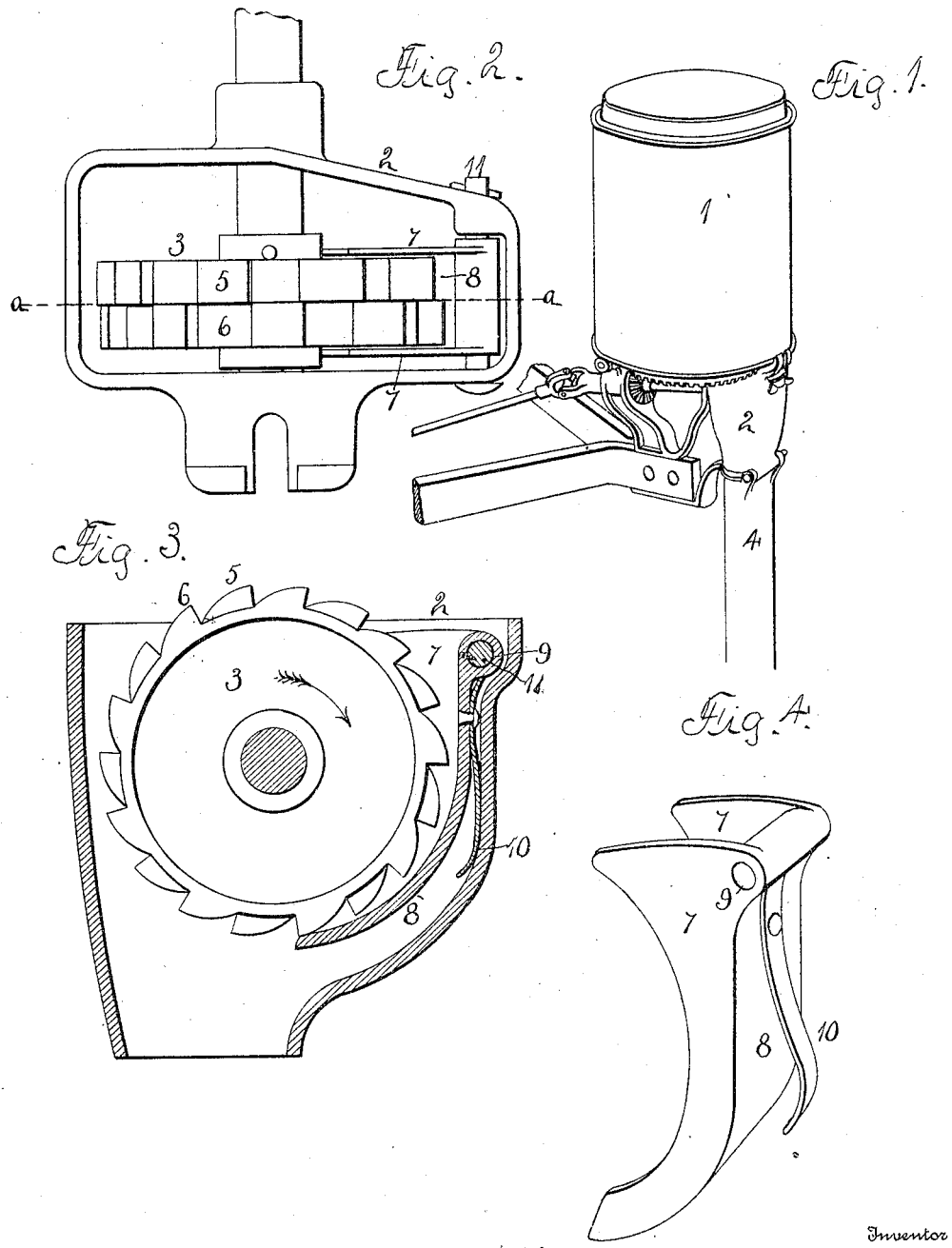

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

COTTON-SEED PLANTER.

No. 803,082.     Specification of Letters Patent.     Patented Oct. 31, 1905.

Application filed March 30, 1904. Serial No. 200,808.

*To all whom it may concern:*

Be it known that I, LEWIS E. WATERMAN, a citizen of the United States, residing at Rockford, in the county of Winnebago and State of Illinois, have invented certain new and useful Improvements in Cotton-Seed Planters, of which the following is a specification.

The object of this invention is to insure a uniform discharge of seed from the seedbox.

In the accompanying drawings, Figure 1 is a perspective view of so much of a planter as is necessary to show the application of my improvements. Fig. 2 is a plan view of the casing containing the picker-wheel. Fig. 3 is a vertical section on dotted line *a*, Fig. 2. Fig. 4 is a perspective view of my improved pressure-plate.

The planter herein shown in the main is of an old construction, comprising the seedbox 1, casing 2, picker-wheel 3, seed-discharge tube 4, and the mechanism for rotating the picker-wheel. The picker-wheel is made up of two series of teeth 5 and 6, alternately spaced, and is located beneath the discharge-opening from the seedbox and rotates in the direction indicated by the arrow.

My improved pressure-plate comprises the side wings 7, connected to a curved center plate 8, having a transverse opening 9 at its upper end. A spring 10 is connected to the rear face of the center portion of the plate, its free end extending toward the lower end of the plate. This plate is pivotally connected to the casing 2 by the pin 11. The spring holds the lower curved end of the plate in contact with the teeth of the picker-wheel in a yielding manner.

Sometimes the cotton-seed drop onto the picker-wheel in a mass and have heretofore been allowed to drop on the ground in that condition, the picker-wheel not separating them. By my improvements the spring holds the plate against the teeth of the picker-wheel with sufficient pressure to enable the teeth of the wheel to separate the seeds; but should the seed wedge in between the teeth and plate the spring will yield sufficiently to allow it to pass. By this arrangement the seeds are uniformly discharged into the tube 4.

I claim as my invention—

In a cotton-planter, the combination of a suitable casing, a picker-wheel located within the casing, a curved plate located within the casing and located in the path of the movement of the picker-wheel, said plate pivoted at one end to the casing and having side wings integral therewith, and a spring holding the plate yieldingly toward the wheel.

LEWIS E. WATERMAN.

Witnesses:
A. O. BEHEL,
E. BEHEL.